(12) United States Patent
MacPherson et al.

(10) Patent No.: US 11,569,542 B2
(45) Date of Patent: Jan. 31, 2023

(54) BATTERY ASSEMBLY FOR A LIGHTING FIXTURE

(71) Applicant: Hubbell Limited, London (GB)

(72) Inventors: John MacPherson, Motherwell North Lanarkshire (GB); Michael Truswell, Hamilton Lanarkshire (GB); Paolo Attanasio Camillo, Uddingston Glasgow (GB); Carl Jackson, Tameside (GB)

(73) Assignee: Hubbell Limited, London (GB)

( * ) Notice: Subject to any disclaimer, the term of this patent is extended or adjusted under 35 U.S.C. 154(b) by 29 days.

(21) Appl. No.: 17/055,666

(22) PCT Filed: May 17, 2019

(86) PCT No.: PCT/GB2019/051359
§ 371 (c)(1),
(2) Date: Nov. 16, 2020

(87) PCT Pub. No.: WO2019/220131
PCT Pub. Date: Nov. 21, 2019

(65) Prior Publication Data
US 2021/0194087 A1    Jun. 24, 2021

(30) Foreign Application Priority Data
May 18, 2018  (GB) ..................... 1808090

(51) Int. Cl.
*H01M 50/213*    (2021.01)
*H01M 50/148*    (2021.01)
*F21S 9/02*    (2006.01)

(52) U.S. Cl.
CPC ........... *H01M 50/213* (2021.01); *F21S 9/022* (2013.01); *H01M 50/148* (2021.01)

(58) Field of Classification Search
CPC ..... H01M 50/213; H01M 50/148; F21S 9/022
See application file for complete search history.

(56) References Cited

U.S. PATENT DOCUMENTS

| | | | |
|---|---|---|---|
| 4,733,337 A * | 3/1988 | Bieberstein | F21L 2/00 362/198 |
| 9,759,391 B1 | 9/2017 | Shew | |

(Continued)

FOREIGN PATENT DOCUMENTS

| | | |
|---|---|---|
| JP | 2010192188 | 9/2010 |
| JP | 2016001545 | 1/2016 |
| WO | 8601578 | 3/1986 |

OTHER PUBLICATIONS

PCT/GB2019/051359 International Search Report and Written Opinion dated Jul. 25, 2019.
GB1808090.3 Search Report dated Nov. 14, 2018.

*Primary Examiner* — Jane J Rhee
(74) *Attorney, Agent, or Firm* — Michael Best & Friedrich LLP

(57) ABSTRACT

A battery assembly for a lighting fixture is provided. The battery assembly includes a battery unit comprising a battery unit housing and a first set of conductive pins. The battery unit housing is configured to accommodate one or more batteries configured to power one or more light sources of the lighting fixture. The first set of conductive pins are in electrical communication with the batteries. The battery assembly includes a battery interface comprising a battery interface housing and a second set of conductive pins. The battery interface housing is configured to accommodate the battery unit housing. The second set of conductive pins are coupled to the light source(s) so that the batteries power the light source(s) when the first set of conductive pins contact the second set of conductive pins. In some implementations, (Continued)

the battery unit can be inserted into the battery interface while the lighting fixture is energized.

19 Claims, 14 Drawing Sheets

(56) References Cited

U.S. PATENT DOCUMENTS

2010/0271814 A1   10/2010   Messinger et al.
2017/0317320 A1   11/2017   Agliata

* cited by examiner

BATTERY ASSEMBLY FOR A LIGHTING FIXTURE

FIELD

The present disclosure relates generally to lighting fixtures, and more particularly to a battery assembly for lighting fixtures.

BACKGROUND

Lighting fixtures (e.g., luminaires) using LEDs or other solid-state light sources have in recent years become somewhat practical and continue to penetrate the lighting market due to the increased luminous efficacy of commercially available LED components. LED lighting systems can include one or more LED devices that become illuminated as a result of the movement of electrons through a semiconductor material. LED luminaires are desirable as they offer energy savings due to good luminous efficacy combined with the ability to precisely control light distribution patterns, which is of particular importance for certain lighting scenarios. LED lighting systems can operate on back battery power (e.g., direct current power) when a primary power supply (e.g., alternating current power) is offline.

SUMMARY

Aspects and advantages of embodiments of the present disclosure will be set forth in part in the following description, or may be learned from the description, or may be learned through practice of the embodiments.

One example aspect of the present disclosure is directed to a battery assembly for a lighting fixture. The battery assembly includes a battery unit and a battery interface. The battery unit includes a battery unit housing and a first set of conductive pins. The battery unit housing is configured to accommodate one or more batteries configured to power one or more light sources of the lighting fixture. The first set of conductive pins are in electrical communication with the one or more batteries. The battery interface includes a battery interface housing and a second set of conductive pins. The battery interface housing is configured to accommodate the battery unit housing. The second set of conductive pins are coupled to the one or more light sources. More specifically, the second set of conductive pins are coupled to the light source(s) via one or more conductors (e.g., wire, pin, etc.) associated with the light source(s). In this manner, the one or more batteries power the light source(s) when the first set of conductive pins contact the second set of conductive pins.

Other example aspects of the present disclosure are directed to lighting systems, light engines, lighting circuits, lighting fixtures, devices, and apparatuses according to example aspects of the present disclosure.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
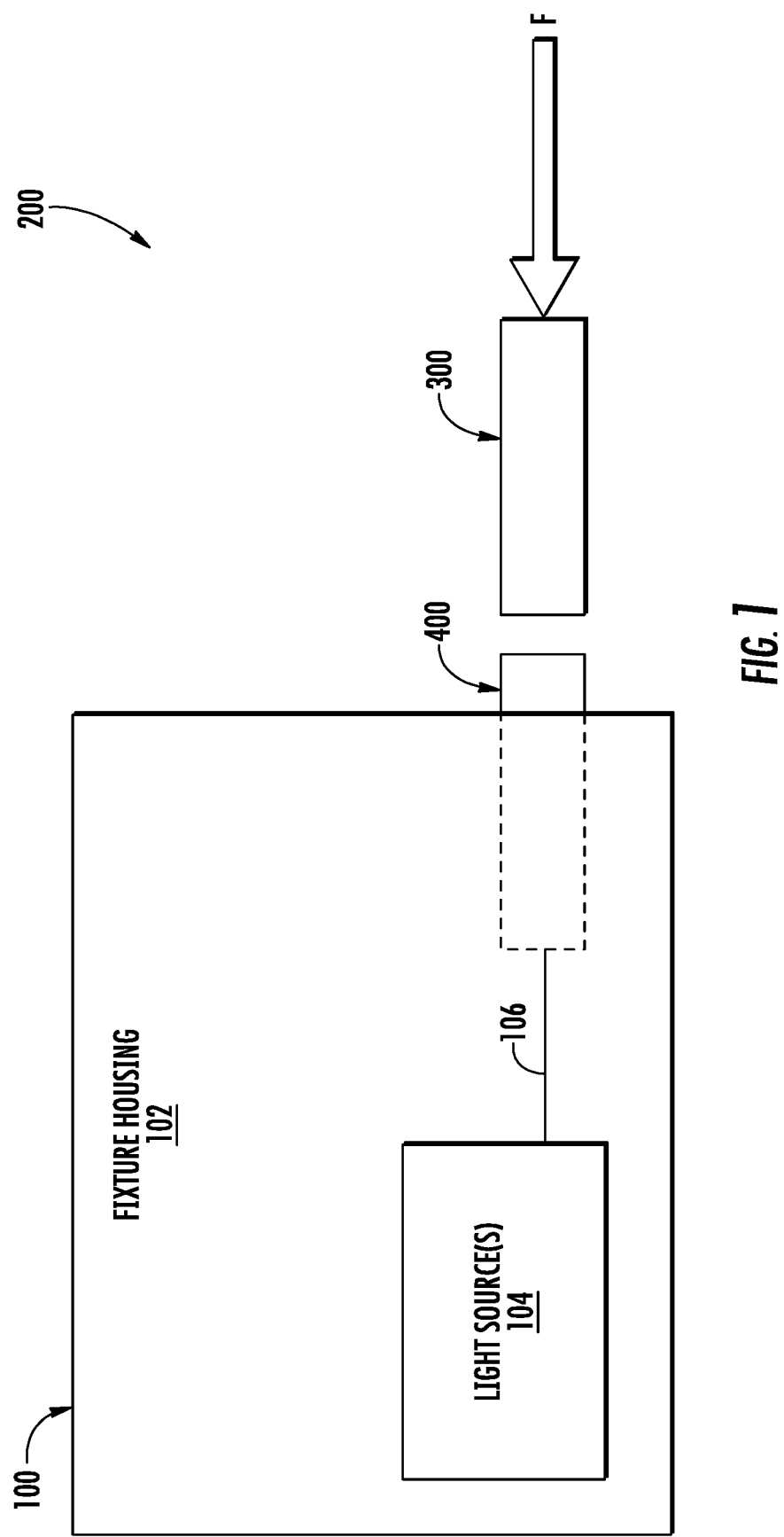
FIG. 1 depicts a schematic view of a battery assembly for a lighting fixture according to example embodiments of the present disclosure.
Figure 2:
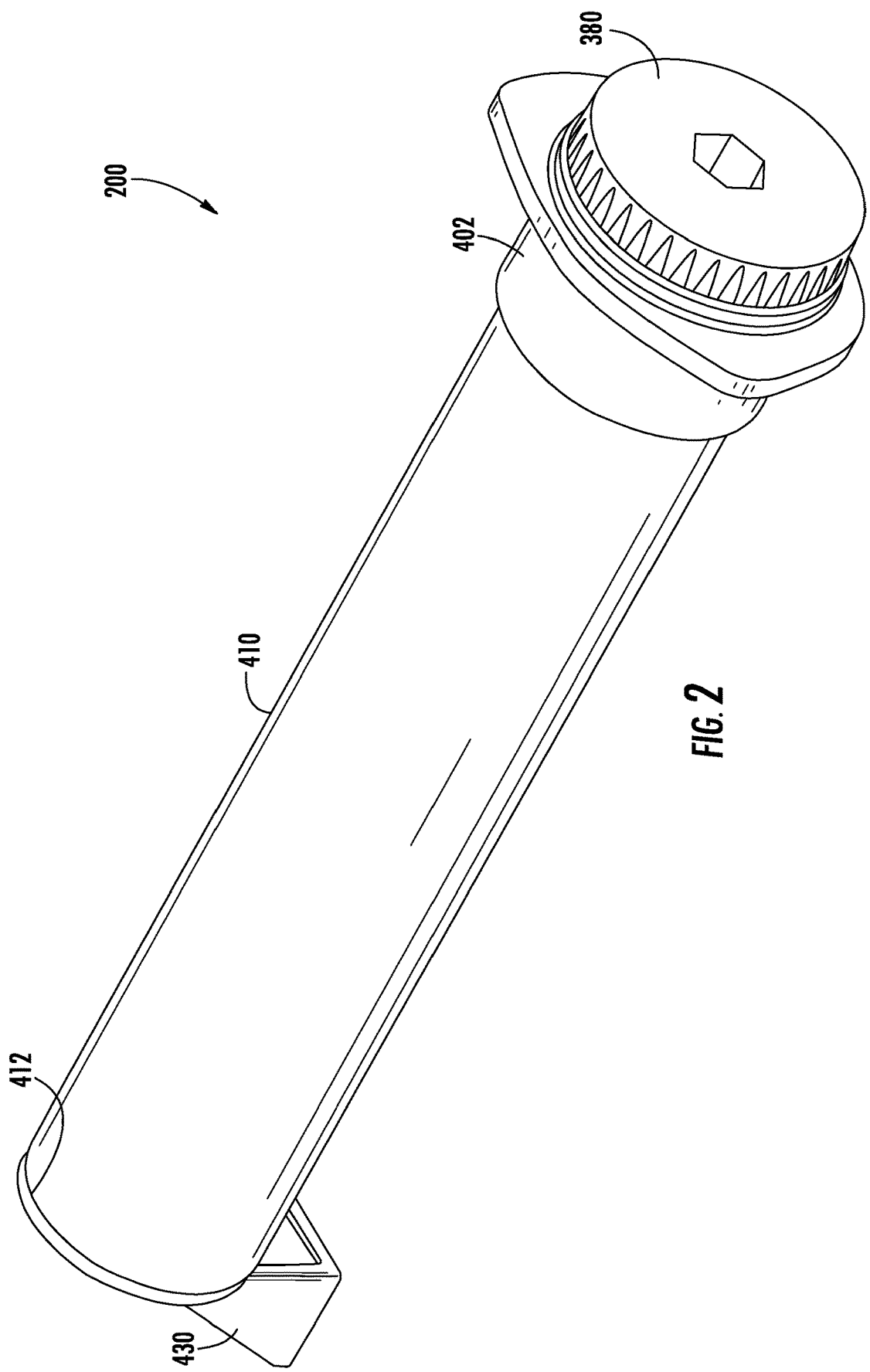
FIG. 2 depicts a perspective view of a battery assembly according to example embodiments of the present disclosure.
Figure 3:
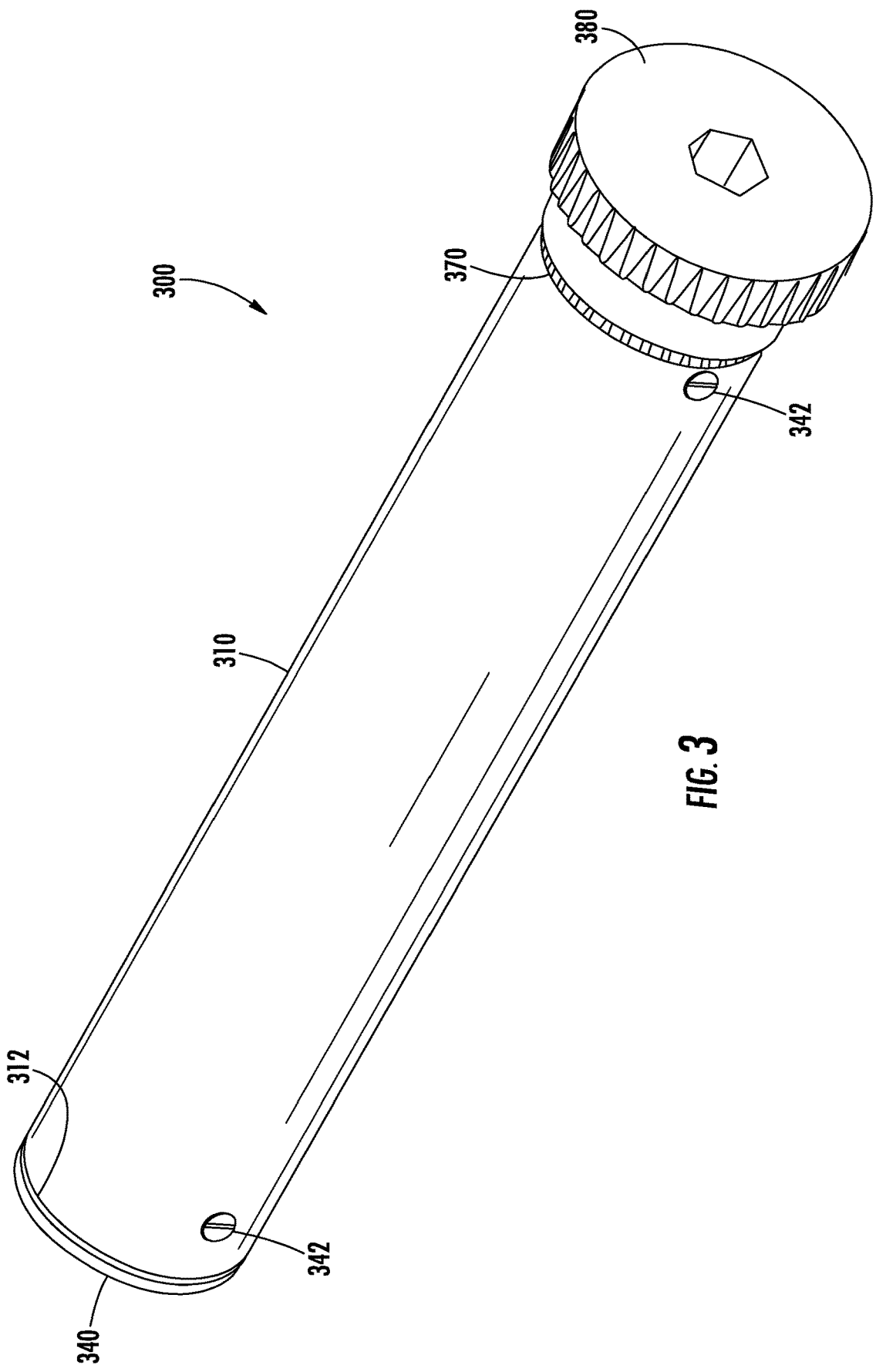
FIG. 3 depicts a perspective view of a battery unit of a battery assembly according to example embodiments of the present disclosure.

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to a battery assembly for a lighting fixture (e.g., an LED lighting fixture) suitable for hazardous environments. For example, the lighting fixture can be rated for hazardous areas where an explosive gas atmosphere is likely to occur during normal operation or in a certain number of instances in a certain time period. For example, a hazardous environment may include areas having an explosive atmosphere of more than 10, but less than 1000 hours per year. In addition, hazardous areas may generally be defined as any place in which an explosive atmosphere may occur in quantities such as to require special precautions to protect the safety of workers.

In some implementations, the battery assembly can include a battery unit and a battery interface. The battery unit can include a battery unit housing and a first set of conductive pins. The battery unit housing can be configured to accommodate one or more batteries configured to power one or more light sources of the lighting fixture. The first set of conductive pins can be in electrical communication with the one or more batteries. In this manner, direct current (DC) power generated by the one or more batteries can be provided to the first set of conductive pins.

In some implementations, the battery unit can include an end cap. The end cap can be coupled to the battery unit housing to enclose a first end of the battery unit housing. Alternatively or additionally, the end cap of the battery unit can define a first aperture and a second aperture. In some implementations, the first set of conductive pins can include a first pin and a second pin. The first pin can extend into the first aperture. The second pin can extend into the second aperture. In some implementations, the battery unit can include a pin holder secured to the end cap. The pin holder can be configured to support the first set of conductive pins. More specifically, the pin holder can be configured to support the first pin and the second pin.

In some implementations, the battery unit can include an end cap assembly. The end cap assembly can be coupled to the battery unit housing to enclose a second end of the battery unit housing. As such, the end cap and the end cap assembly can enclose the one or more batteries within the battery unit housing. In this manner, the battery unit according to the present disclosure can be transported and used in lighting fixtures located in, for instance, a hazardous environment.

In some implementations, the end cap assembly can include a first end cap and a second end cap. The first end cap can be coupled to the battery unit housing. The second end cap can included a threaded portion. In some implementations, the threaded portion of the second end cap can be configured to engage a threaded portion defined on the first end cap. More specifically, the threaded portion on the first end cap can be defined on an interior surface of the first end cap. In some implementations, the battery unit can include one or more battery spacers positioned between the first end cap and the one or more batteries.

In some implementations, the battery interface can include a battery interface housing and a second set of conductive pins. The battery interface housing can be configured to accommodate the battery unit housing. The second set of conductive pins can be coupled to the one or more light sources of the lighting fixture. In this manner, DC power generated by the one or more batteries can be provided to the one or more light sources when the battery unit housing is inserted into the battery interface housing such that the first set of conductive pins contact the second set of conductive pins.

In some implementations, the battery interface can include an end cap coupled to the battery interface housing to enclose a first end of the battery interface housing. The end cap can define a first aperture and a second aperture. In some implementations, the second set of conductive pins can include a first pin and a second pin. The first pin can extend through the first aperture. The second pin can extend through the second aperture. In some implementations, the battery interface can include a pin holder secured to the end cap of the battery interface. The pin holder can be configured to support the second set of conductive pins. In some implementations, the battery interface can include a sleeve configured to cover at least a portion of the end cap assembly of the battery unit.

In some implementations, at least a portion of the battery interface housing can be positioned within a fixture housing of the lighting fixture. In this manner, the battery unit can easily be inserted into the battery interface without requiring disassembly of one or more components of the lighting fixture. Additionally, the battery unit can be inserted into the battery interface while the lighting fixture is energized. Accordingly, the battery assembly according to the present disclosure can be used to power light sources of lighting fixtures located in, for instance, a hazardous environment where de-energizing the lighting fixture and/or disassembling one or more fixture components would be undesirable.

Referring now to FIGS., FIG. 1 depicts a schematic view of a battery assembly 200 for a lighting fixture 100 according to example embodiments of the present disclosure. The battery assembly 200 can include a battery unit 300 and a battery interface 400. In some implementations, at least a portion of the battery interface 400 can be disposed within a fixture housing 102 of the lighting fixture 100. As will be discussed below in more detail, the battery interface 400 can be configured to accommodate the battery unit 300.

In some implementations, a force F can be applied to the battery unit 300 to move (e.g., insert) the battery unit 300 into the battery interface 400. More specifically, the battery unit 300 can be inserted into the battery interface 300 so that conductive pins of the battery unit 300 can contact conductive pins of the battery interface 400. Additionally, the battery interface 400 can be coupled to the one or more light sources 104 of the lighting fixture. More specifically, the conductive pins of the battery interface 400 can be coupled to the light source(s) 104 via one or more conductors (e.g., wires, pins) associated with the light source(s) 104. In this manner, one or more batteries of the battery unit 300 can provide power to one or more light sources 104 of the lighting fixture 100.

In some implementations, at least a portion of the battery interface 400 can be disposed within the fixture housing 102 of the lighting fixture 100. In this manner, the battery unit 300 can be inserted into the fixture housing 102 without requiring disassembly of one or more components of the lighting fixture 100. Additionally, the battery unit 300 can be configured to slid into and out of the battery interface 400. In this manner, the battery unit 300 can be removed and replaced as needed without requiring disassembly of one or more components of the lighting fixture 100. Accordingly, the battery assembly 200 according to the present disclosure can be used to power light sources 104 of lighting fixtures 100 located in, for instance, a hazardous environment where disassembling one or more components of the lighting fixture 100 would be undesirable.

As used herein, a "lighting fixture" or "luminaire" refers to a device used to provide light or illumination using one or more light sources. The lighting fixture 100 can be, for instance, a lighting fixture configured to provide lighting in a hazardous environment, such as an oil rig. The lighting fixture 100 can be mounted to a pole, wall, or other structure using a plurality of different mounting options. For instance, the lighting fixture 100 can include a mounting yoke or bracket for mounting to a horizontal arm. Alternatively, the lighting fixture 100 can be mounted, for instance, using a pole, wall, vertical tenon, or traditional arm mounting. Mounting options can also include use of a wall bracket, adjustable knuckle, outer diameter slip fit arm mount, rectangular arm, etc.

Referring now to FIGS. 2-9, an example embodiment of the battery unit 300 of the battery assembly 200 is provided according to the present disclosure. As shown, the battery unit 300 can include a battery unit housing 310 extending between a first end 312 and a second end 314. In some implementations, the battery unit housing 310 can be configured to accommodate one or more batteries 320 of the battery unit 300. For instance, as shown specifically in FIG. 5, the battery unit housing 310 can accommodate six batteries. However, it should be appreciated that the battery unit housing 310 can be configured to accommodate more or fewer batteries 320. It should also be appreciated that the batteries 320 of the battery unit 300 can include any suitable battery configured to provide direct current (DC) power.

Figure 6:
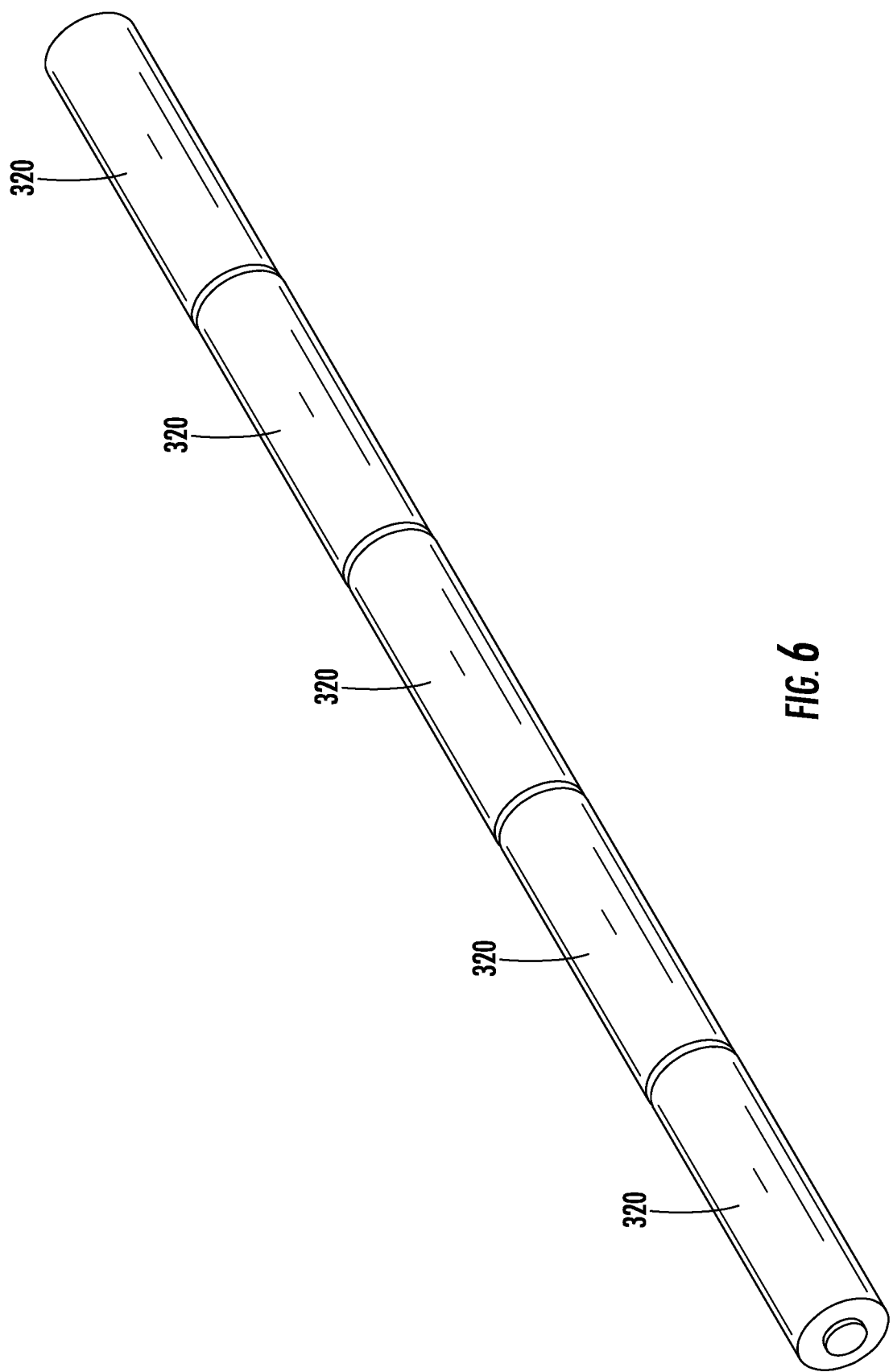
FIG. 6 depicts a plurality of batteries of the battery unit in FIG. 5 according to example embodiments of the present disclosure.
Figure 7:
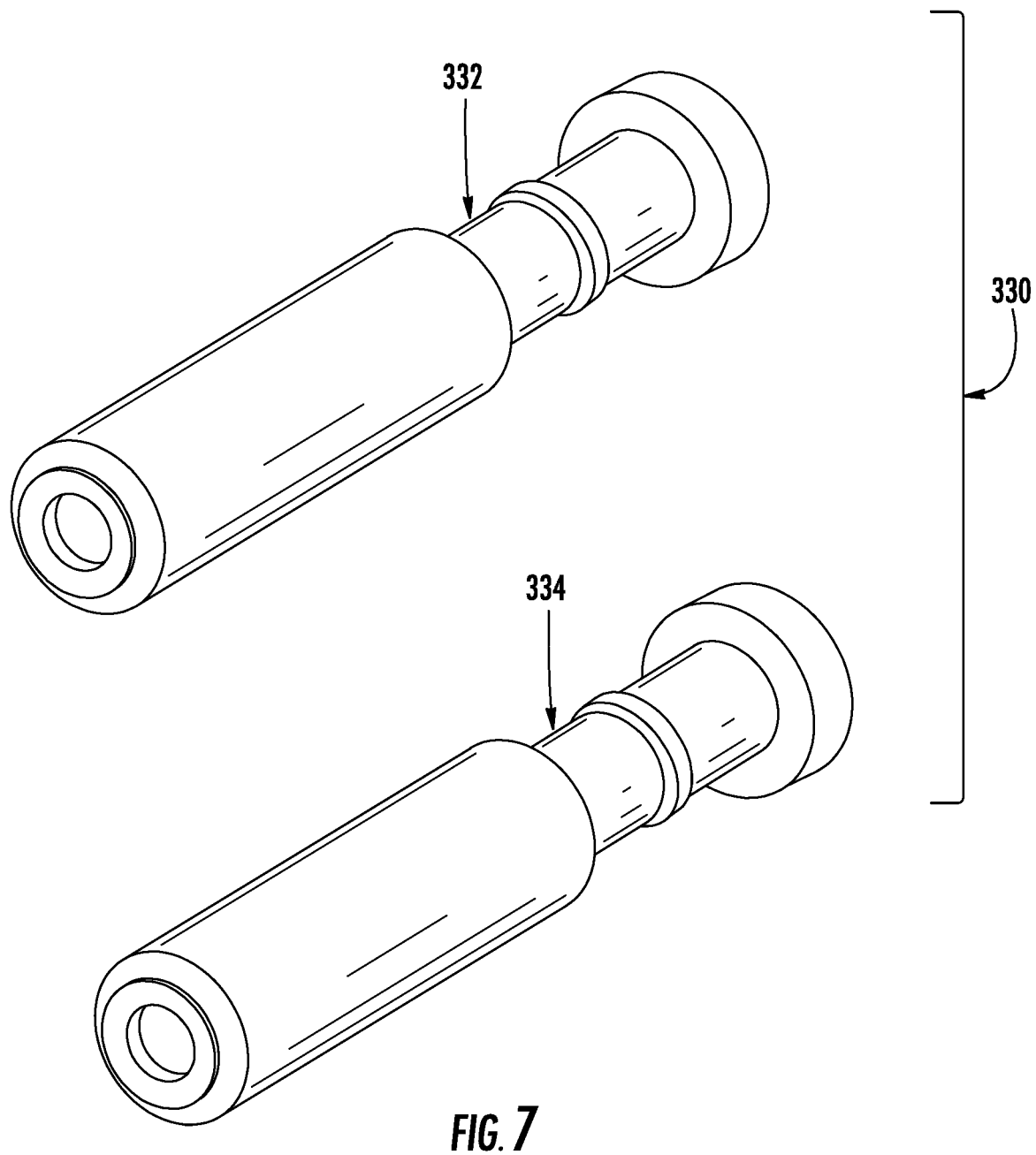
FIG. 7 depicts a first set of conductive pins of the battery unit depicted in FIG. 5 according to example embodiments of the present disclosure.

In some implementations, the batteries 320 of the battery unit can be arranged in a pack formation as shown in FIG. 6. Alternatively, each battery of the batteries 320 can be arranged in an end-to-end configuration as shown in FIG. 7. It should be appreciated, however, that the batteries 320 can be arranged in any suitable manner.

In some implementations, the battery unit 300 can include a first set of conductive pins 330 disposed within the battery unit housing 310. More specifically, the first set of conductive pins 330 can be in electrical communication with the batteries 320 disposed within the battery unit housing 310. In this manner, DC power generated by the batteries 320 can be provided to the first set of conductive pins 330.

Figure 12:
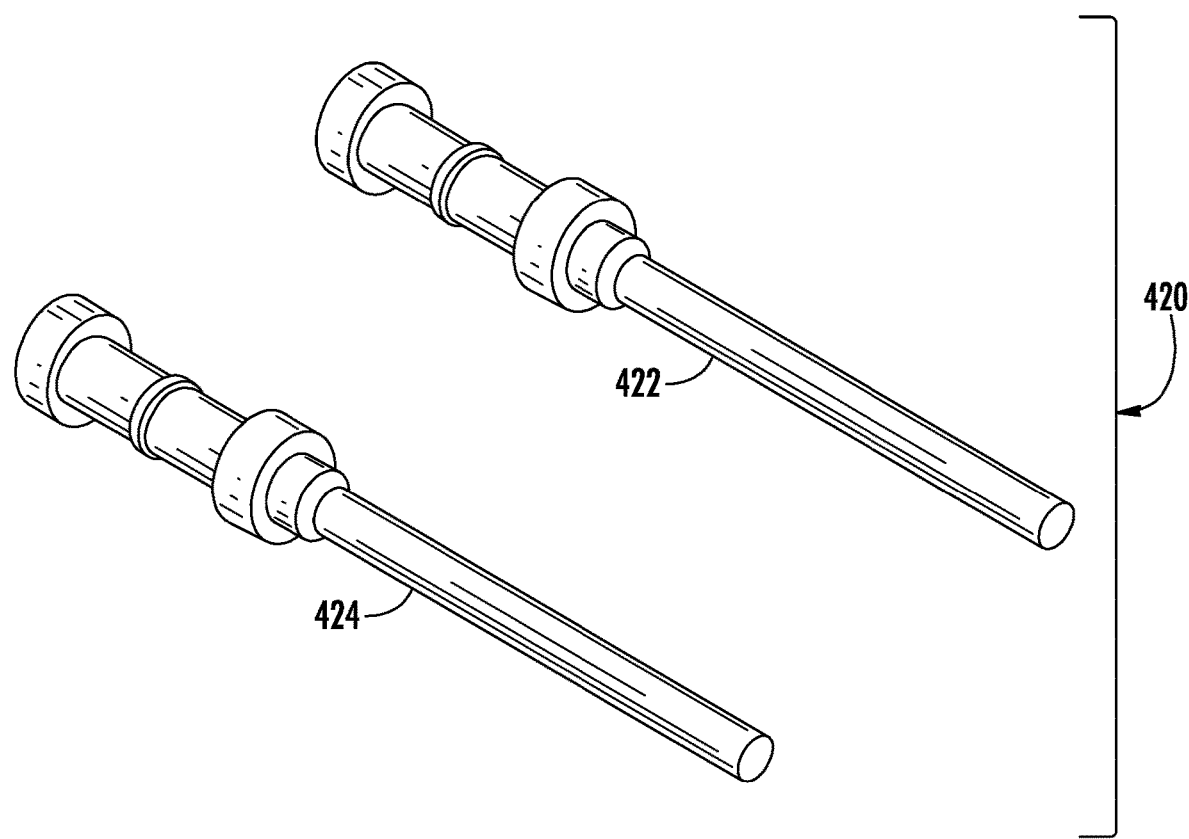
FIG. 12 depicts a second set of conductive pins of the battery interface depicted in FIG. 11 according to example embodiments of the present disclosure.

In some implementations, the first set of conductive pins 330 can include a first conductive pin 332 and a second conductive pin 334. As shown in FIG. 6, the first conductive pin 332 and the second conductive pin 334 can each be configured as a female pin. In alternative implementations, the first conductive pin 332 and the second conductive pin 334 can each be configured as a male pin (FIG. 12).

In some implementations, the battery unit 300 can include an end cap 340 coupled to the battery unit housing 310 to enclose the first end 312 of the battery unit housing 310. More specifically, the end cap 340 can be coupled to the battery unit housing 310 via one or more fasteners 342 (e.g., screws) extending through correspond apertures (not shown) defined in the battery unit housing 310 and the end cap 340. It should be appreciated, however, that the end cap 340 can, in some implementations, be coupled to the battery unit housing 310 without requiring the one or more fasteners 342. For instance, in some implementations, the end cap 340 and the first end 312 of the battery unit housing 310 can each include a threaded portion. In this manner, the threaded portion of the end cap 340 can engage the threaded portion of the first end 312 to secure the end cap 340 to the battery unit housing 310.

Figure 8B:
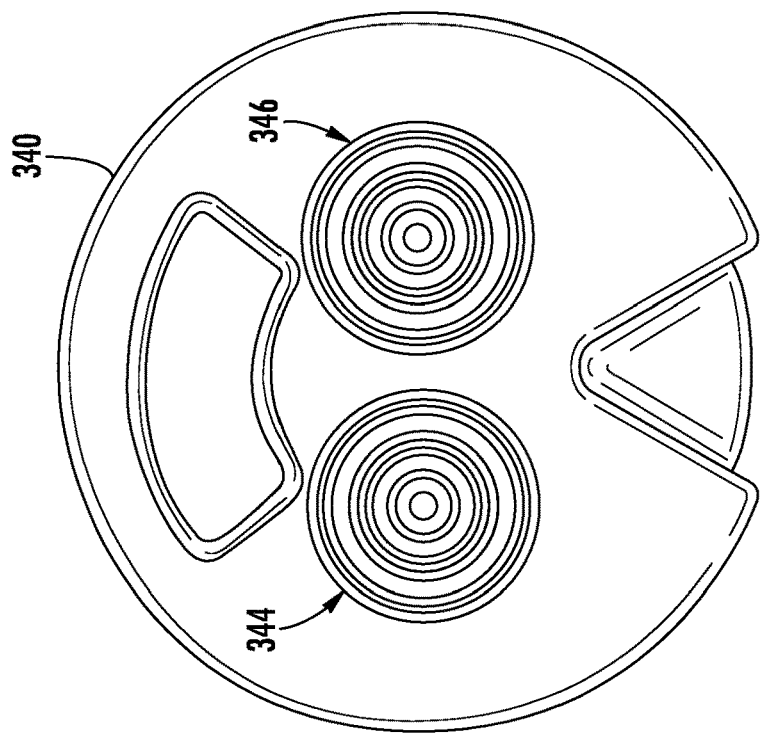
FIG. 8B depicts a rear view of an end cap of the battery unit depicted in FIG. 5 according to example embodiments of the present disclosure.
Figure 8A:
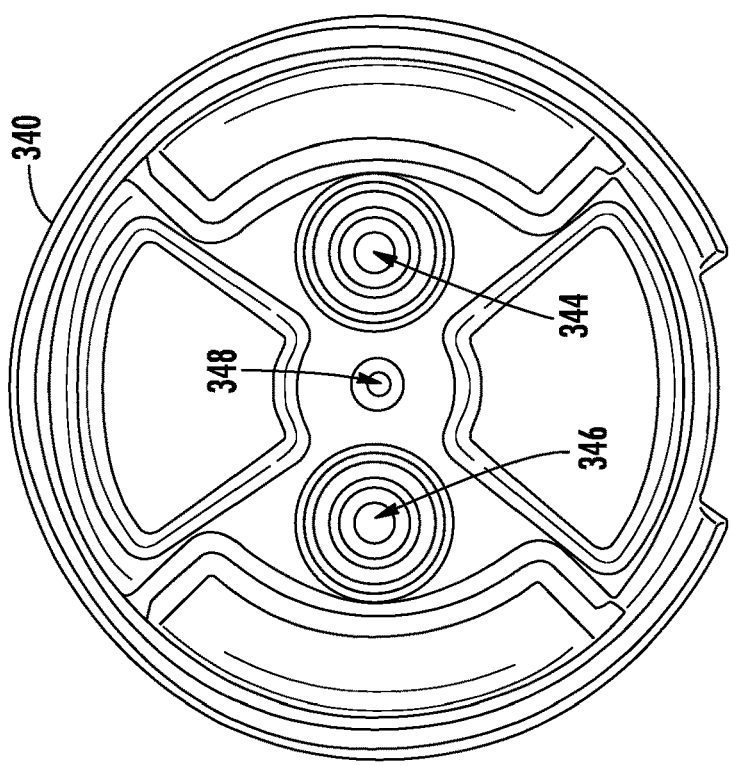
FIG. 8A depicts a front view of an end cap of the battery unit depicted in FIG. 5 according to example embodiments of the present disclosure.

As shown in FIGS. 8A and 8B, the end cap 340 can define a first aperture 344 and a second aperture 346. In some implementations, a circumference of the first aperture 344 measured at a front portion (FIG. 8A) of the end cap 340 can be different than a circumference of the first aperture 344 measured at a rear portion (FIG. 8B) of the end cap 340. More specifically, the circumference of the first aperture 344 at the front portion can be less than the circumference of the first aperture 344 at the rear portion. It should be appreciated that a circumference of the second aperture 346 measured at the front portion of the end cap 340 can be different than a circumference of the second aperture 346 measured at the rear portion of the end cap 340.

Figure 4:
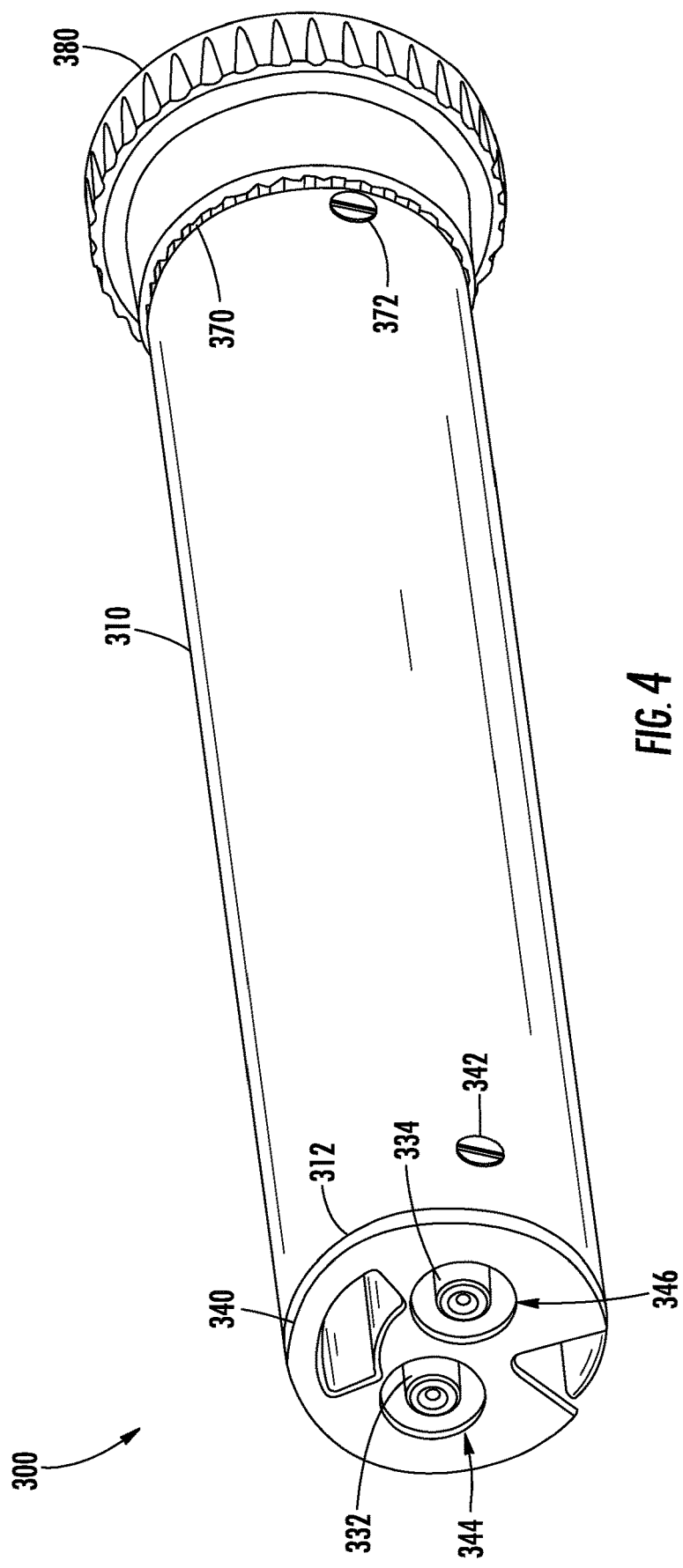
FIG. 4 depicts another perspective view of a battery unit according to example embodiments of the present disclosure.

In some implementations, the first conductive pin 332 can, as shown in FIG. 4, extend into the first aperture 344. More specifically, the first conductive pin 332 can extend into the first aperture 344 from the front portion (FIG. 8A) of the end cap 340. Additionally, the first conductive pin 332 can extend towards the rear portion (FIG. 8B) of the end cap 340. It should be appreciated that the second conductive pin 334 can extend into the second aperture 346 from the front portion of the end cap 340 and can extend toward the rear portion of the end cap 340.

Figure 14:
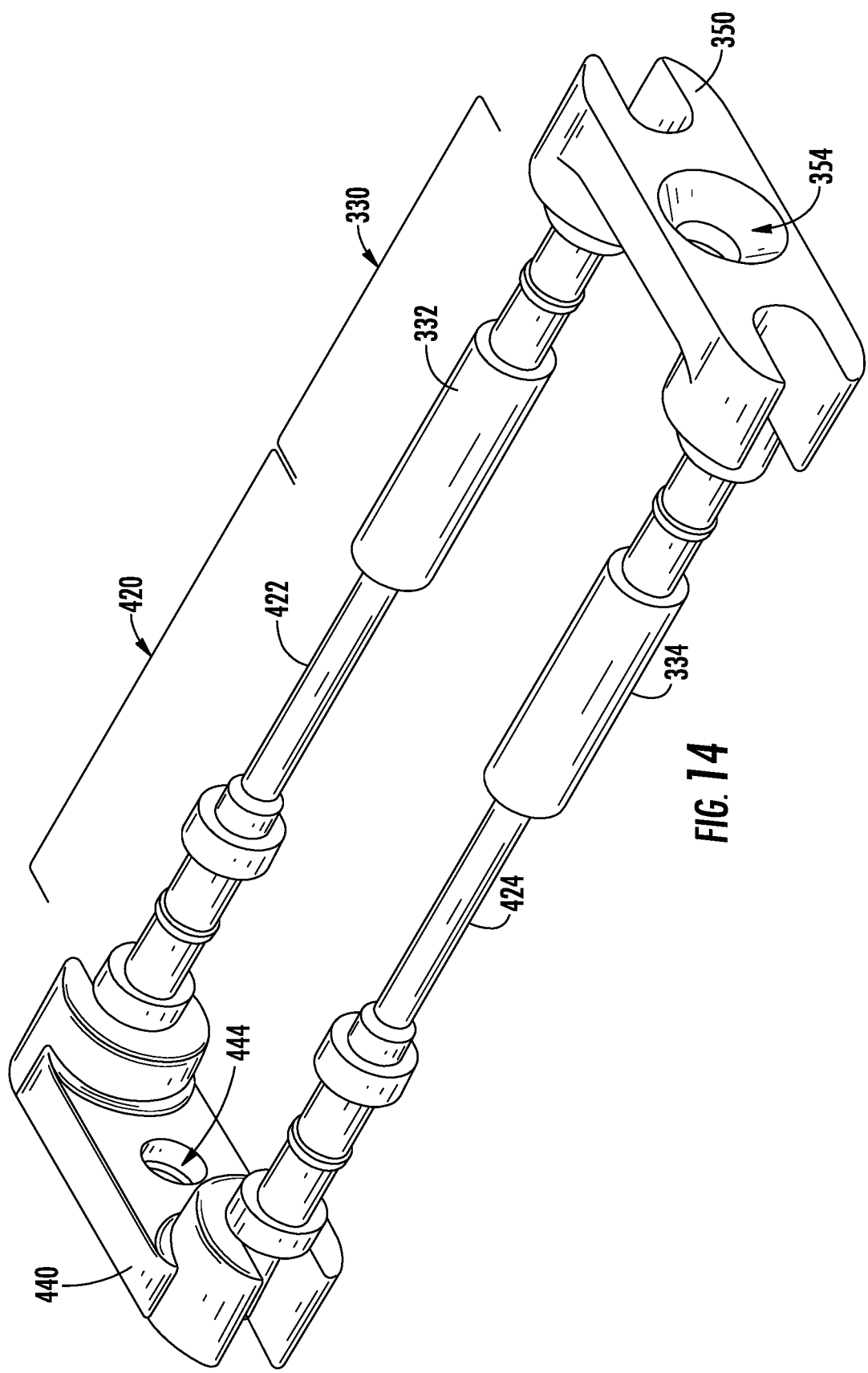
FIG. 14 depicts first conductive pins of a battery unit contacting second conductive pins of a battery interface according to example embodiments of the present disclosure.

In some implementations, the battery unit 300 can include a pin holder 350 configured to support at least a portion of the first conductive pin 332 and at least a portion of the second conductive pin 334. The pin holder 350 can be secured to the front portion (FIG. 8A) of the end cap 340 via one or more fasteners 352. More specifically, the fastener(s) 352 can extend through an aperture 354 (FIG. 14) defined in the pin holder 350 and a corresponding aperture 348 defined in the front portion (FIG. 8A) of the end cap 340.

In some implementations, the battery unit 300 can include a first plug (not shown) configured to plug the first aperture 342 at the rear portion (FIG. 8B) of the end cap 340. Alternatively or additionally, the battery unit 300 can include a second plug (not shown) configured to cover the second aperture 344 at the rear portion of the end cap 340. In this manner, both the first conductive pin 332 and the second conductive pin 334 can be sealed off from an environment (e.g., hazardous environment) surrounding the battery unit housing 310. Accordingly, the battery unit 300 can be transported within the environment without being susceptible to ignition sources. It should be appreciated, however, that the plugs can be removed immediately prior to inserting the battery unit 300 into the battery interface 400 (FIG. 1).

Figure 9:
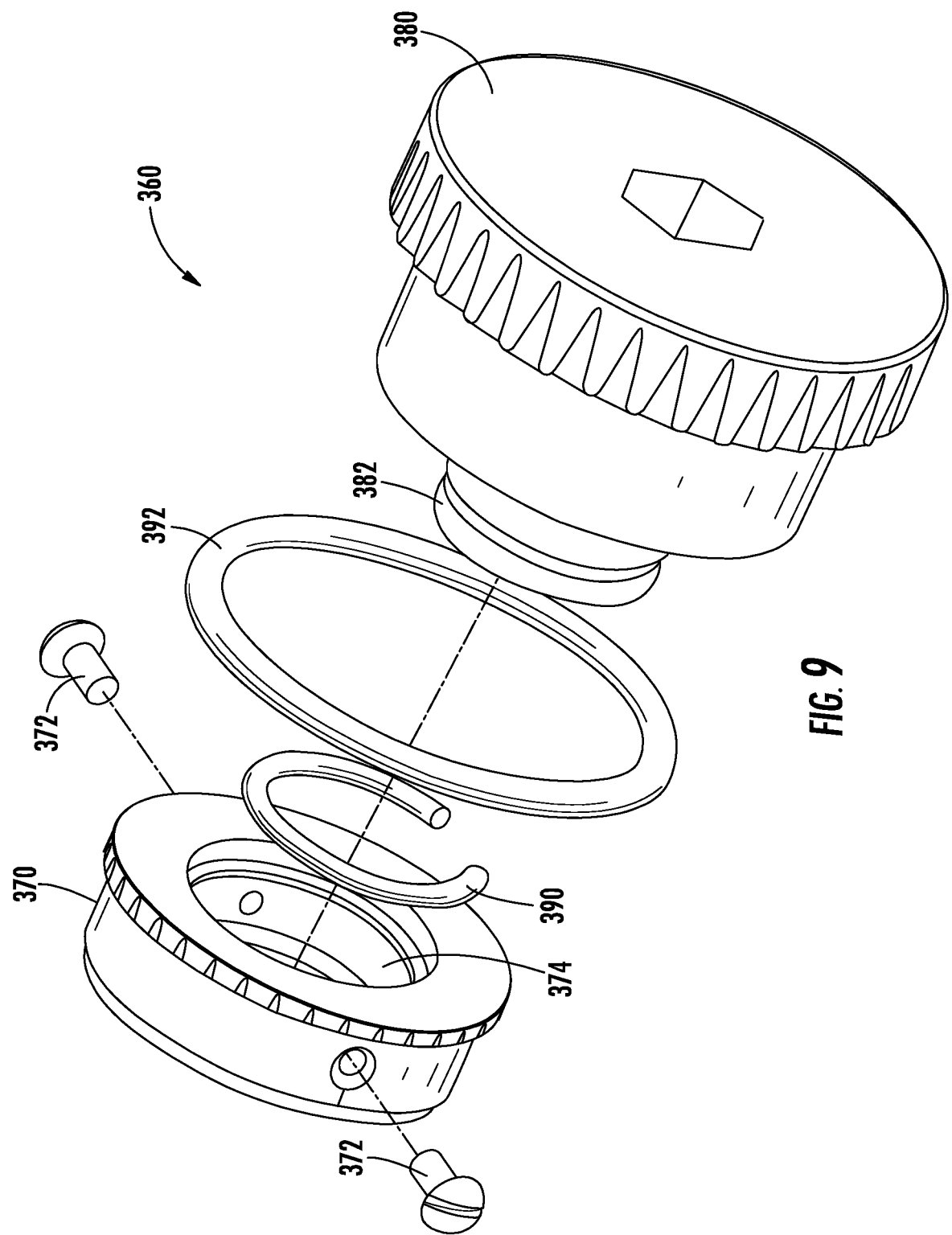
FIG. 9 depicts an exploded view of an end cap assembly of the battery unit depicted in FIG. 5
Figure 10:
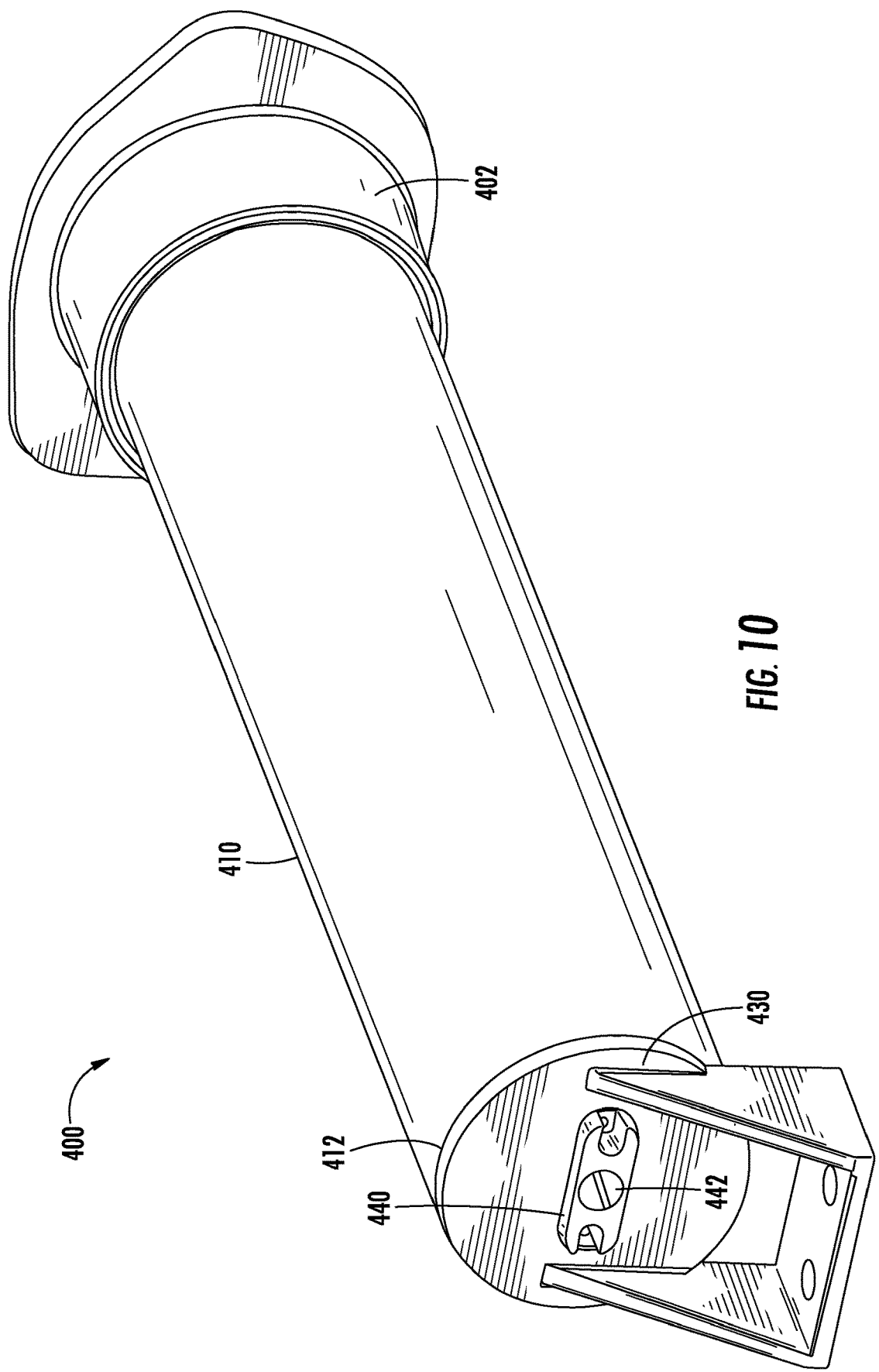
FIG. 10 depicts a perspective view of a battery interface of a battery assembly according to example embodiments of the present disclosure.

In some implementations, the battery unit 300 can include an end cap assembly 360 coupled to the battery unit housing 310 to enclose the second end 314 of the battery unit housing 310. As shown in FIG. 9, the end cap assembly 360 can include a first end cap 370 and a second end cap 380. In some implementations, the first end cap 370 can be coupled to the battery unit housing 310 via one or more fasteners 372 (e.g., screws). Alternatively or additionally, the second end cap 380 can include a threaded portion 382 configured to engage a threaded portion (not shown) of the first end cap 370. More specifically, the threaded portion can be defined on an interior surface 374 of the first end cap 370. In this manner, the threaded portion 382 of the second end cap 380 can engage the threaded portion of the first end cap 370 to enclose the second end 314 of the battery unit housing 310. In some implementations, the end cap assembly 360 can include a retaining clip 390 configured to secure the second end cap 380 to the first end cap 370. Alternatively or additionally, the end cap assembly 360 can include a sealing member 392 configured to form a substantially fluid-tight seal between the second end cap 380 and one or more components of the battery interface 400. More specifically, the sealing member 392 can be configured to form the substantially fluid-tight seal between the second end cap 380 and a sleeve 402 (FIG. 2) of the battery interface 400.

Figure 5:
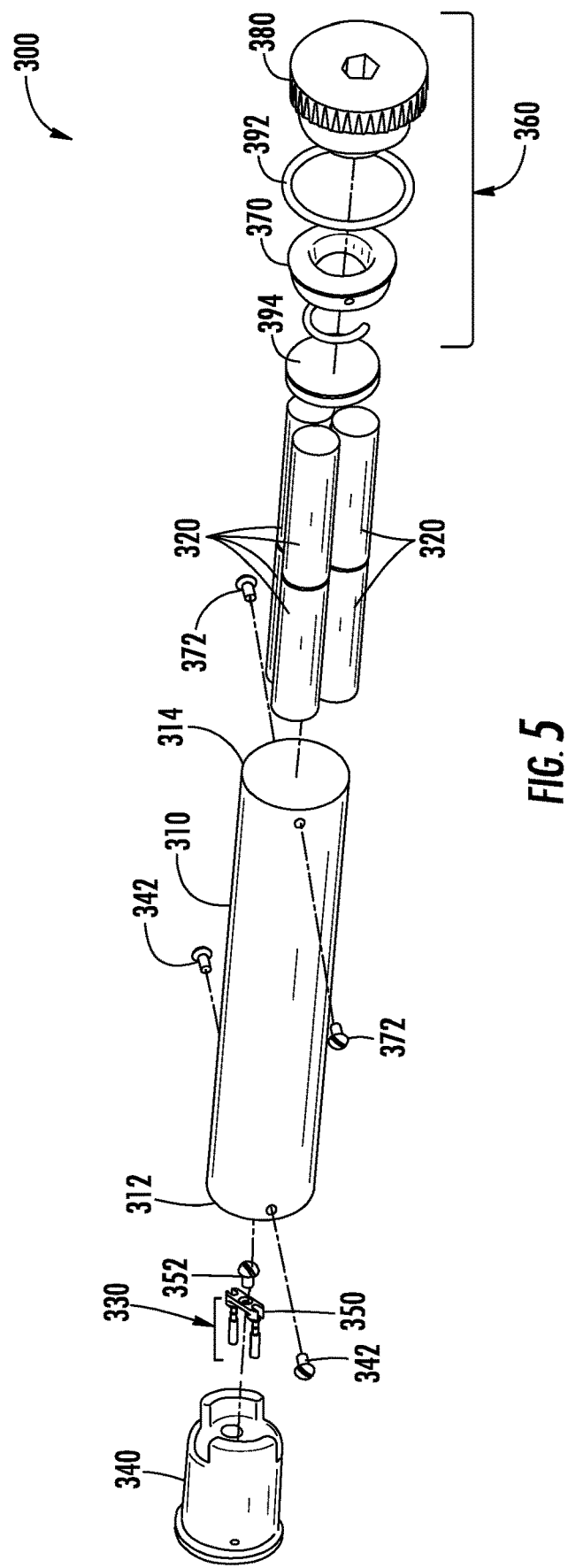
FIG. 5 depicts an exploded view of a battery unit of a battery unit according to example embodiments of the present disclosure.

In some implementations, the battery unit 300 can include a battery spacer 394. As shown in FIG. 5, the battery spacer 394 can be positioned between the batteries 320 and the first end cap 370 of the end cap assembly 360. It should be appreciated that, in some implementations, more than one battery spacer 394 can be positioned between the batteries 320 and the first end cap 370 of the end cap assembly 360.

Referring now to FIGS. 10-13 an example embodiment of the battery interface 400 of the battery assembly 200 is provided according to the present disclosure. As shown, the battery interface 400 can include a battery interface housing 410 extending between a first end 412 and a second end 414. In some implementations, the battery interface housing 410 can be configured to accommodate the battery unit housing 310. For instance, the battery unit hout 310 can be inserted into the battery interface housing 410 such that the first set of conductive pins 330 (FIG. 6) of the battery unit 300 contact a second set of conductive pins 420 of the battery interface 400.

In some implementations, the second set of conductive pins 420 can be coupled to the light source(s) 104 (FIG. 1) of the lighting fixture 100. More specifically, the second set of conductive pins 420 can contact conductors 106 (e.g., wires, pins, etc.) associated with the light source(s) 104. As such, a closed electrical path can be formed between the batteries 320 (FIG. 5) and the light source(s) 104 when, as shown in FIG. 13, the first set of conductive pins 330 contact the second set of conductive pin 420. In this manner, DC power generated by the batteries 320 (FIG. 5) can be provided to the light source(s) 104 (FIG. 1) of the lighting fixture 100 (FIG. 1) when the first set of conductive pins 330 contacts the second set of conductive pins 420.

Figure 11:
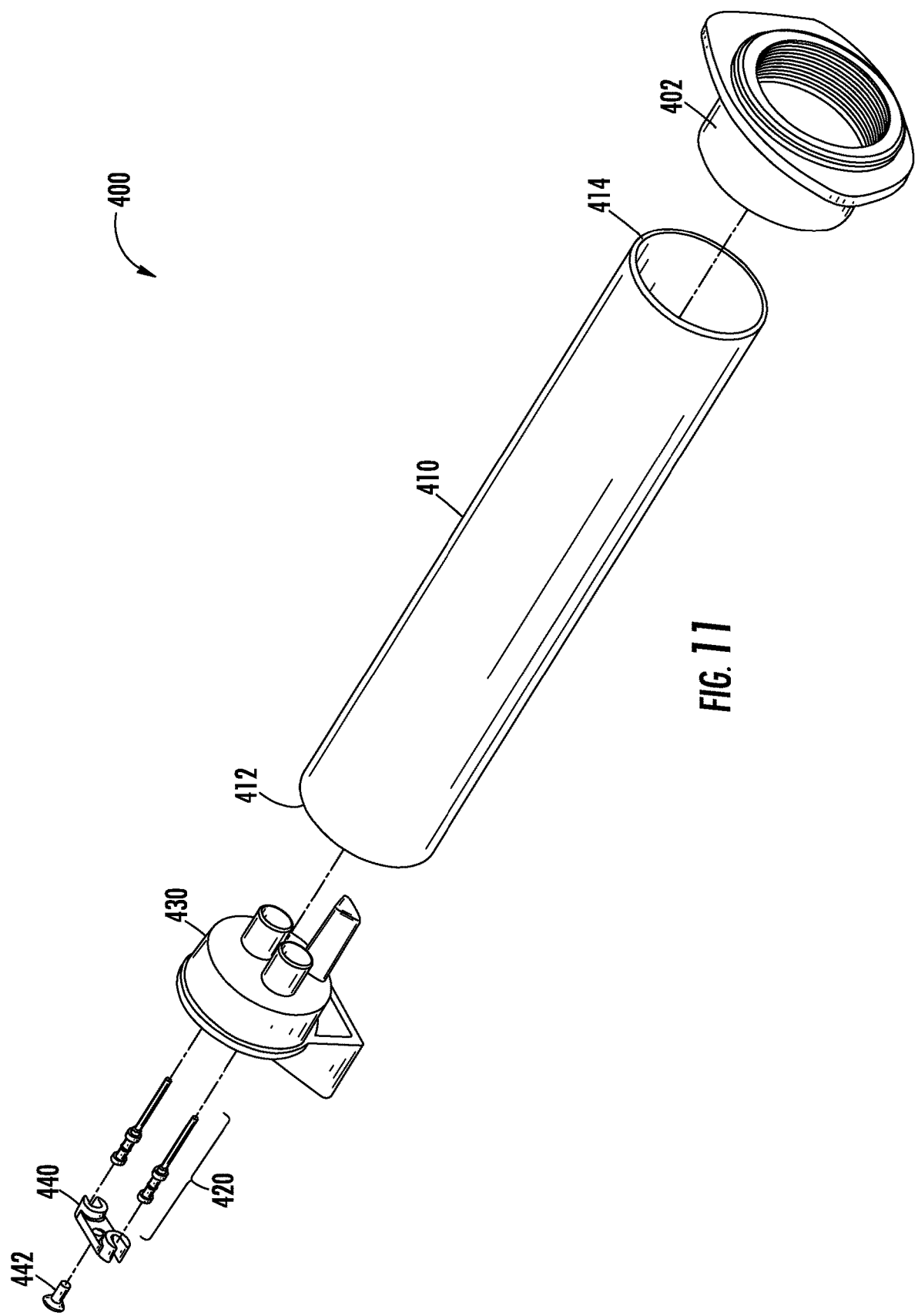
FIG. 11 depicts an exploded view of a battery interface of a battery assembly according to example embodiments of the present disclosure.

In some implementations, the second set of conductive pins 420 can include a first conductive pin 422 and a second conductive pin 424. As shown in FIG. 11, the first conductive pin 422 and the second conductive pin 424 can each be configured as a male pin. In alternative implementations, the first conductive pin 422 and the second conductive pin 424 can each be configured as a female pin (FIG. 6).

Figure 13B:
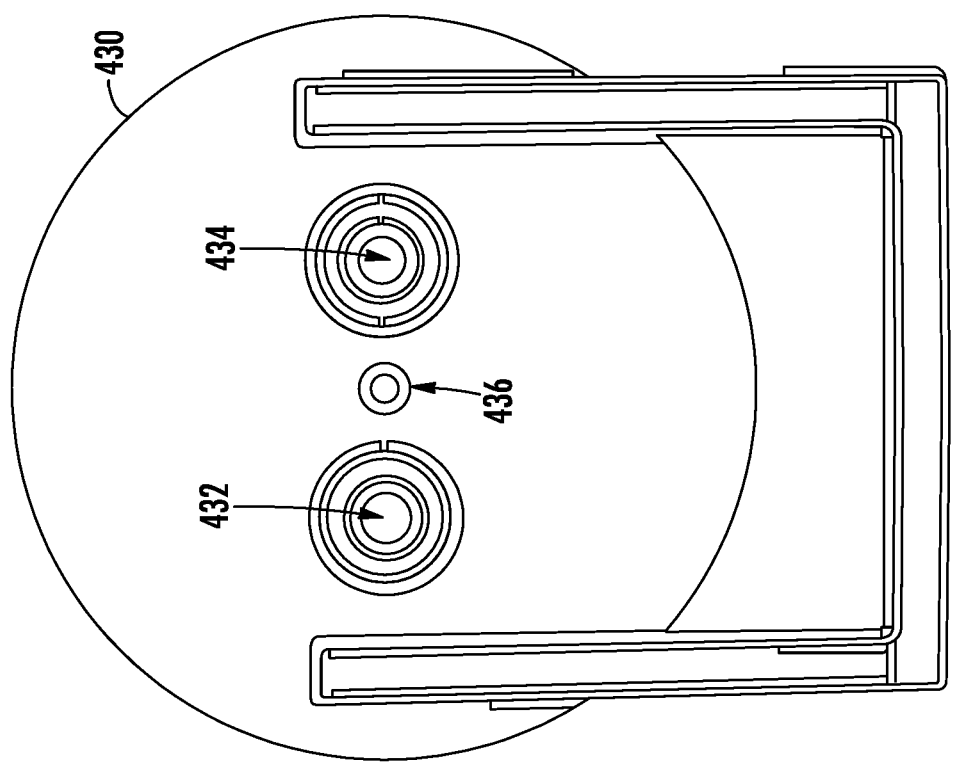
FIG. 13B depicts a rear view of an end cap of the battery interface depicted in FIG. 11 according to example embodiments of the present disclosure.
Figure 13A:
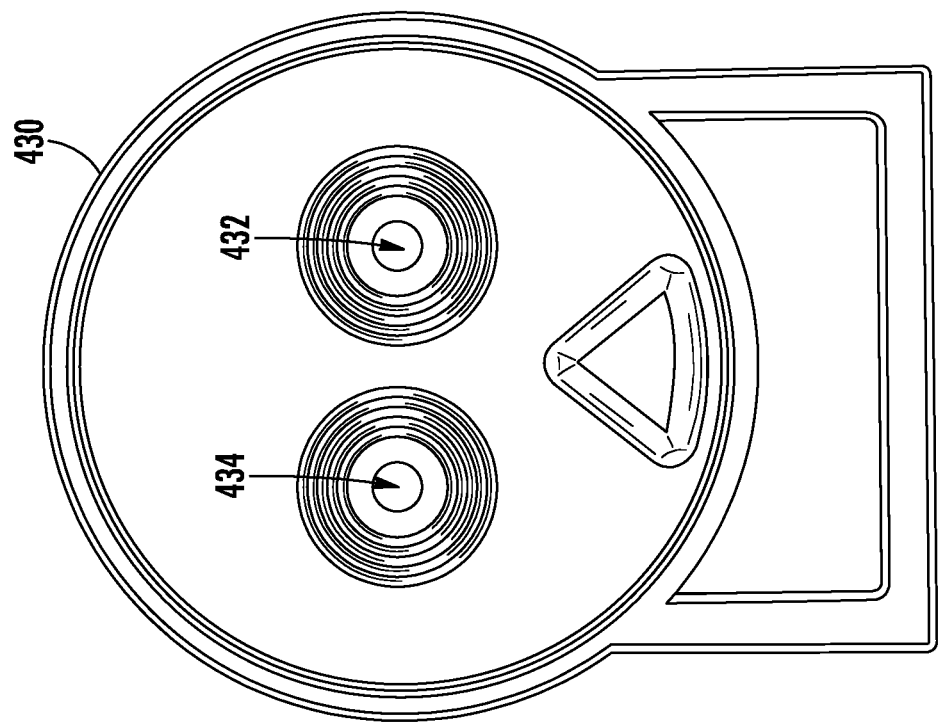
FIG. 13A depicts a front view of an end cap of the battery interface depicted in FIG. 11 according to example embodiments of the present disclosure.

In some implementations, the battery interface 400 can include an end cap 430 coupled to the battery interface housing 410 to enclose the first end 412 of the battery interface 400. More specifically, the end cap 430 can be press-fit against the first end 412 of the battery interface housing 410. As shown in FIGS. 13A and 13B, the end cap 430 can define a first aperture 432 and a second aperture 434. In some implementations, a circumference of the first aperture 432 measured at a front portion (FIG. 13A) of the end cap 430 can be different than a circumference of the first aperture 432 measured at a rear portion (FIG. 13B) of the end cap 430. More specifically, the circumference of the first aperture 432 at the front portion can be less than the circumference of the first aperture 432 at the rear portion. It should be appreciated that a circumference of the second aperture 434 measured at the front portion of the end cap 430 can be different than a circumference of the second aperture 434 measured at the rear portion of the end cap 340.

In some implementations, the first conductive pin 422 can extend through the first aperture 432. Alternatively or additionally, the second conductive pin 424 can extend through the second aperture 434. In some implementations, the battery interface can include a pin holder 440 configured to support at least a portion of the first conductive pin 422 and at least a portion of the second conductive pin 424. The pin holder 440 can be secured to the rear portion (FIG. 13B) of the end cap 430 via one or more fasteners 442. More specifically, the fastener(s) 442 can extend through an aperture 444 (FIG. 14) defined in the pin holder 440 and a corresponding aperture 436 defined in the rear portion (FIG. 13B) of the end cap 430.

The example configurations illustrated in the figures are provided for purposes of illustration and discussion. Those of ordinary skill in the art, using the disclosures provided herein will understand that other example configurations can be generated using the lighting fixture 100 without deviating from the scope of the present disclosure.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

The invention claimed is:

1. A lighting fixture comprising one or more light sources and a battery assembly comprising:
   a battery unit comprising a battery unit housing and a first set of conductive pins, the battery unit housing configured to accommodate one or more batteries configured to power the one or more light sources, the first set of conductive pins in electrical communication with the one or more batteries; and
   a battery interface comprising
      a battery interface housing and a second set of conductive pins, the battery interface housing configured to accommodate the battery unit housing, the second set of conductive pins coupled to the one or more light sources,
   wherein the one or more batteries power the light source(s) when the first set of conductive pins contact the second set of conductive pins.

2. The lighting fixture of claim 1, wherein the first set of conductive pins contact the second set of conductive pins when the battery unit housing is disposed within the battery interface housing.

3. The lighting fixture of claim 1, wherein at least a portion of battery interface is disposed within a fixture housing of the lighting fixture.

4. The lighting fixture of claim 1, wherein:
   the first set of conductive pins include one or more female pins; and
   the second set of conductive pins include one or more male pins.

5. The lighting fixture of claim 1, wherein the battery interface comprises an end cap coupled to the battery interface housing to enclose a first end of the battery interface housing.

6. The lighting fixture of claim 5, wherein the battery interface comprises a pin holder secured to the end cap, the pin holder configured to support the second set of conductive pins.

7. The lighting fixture of claim 5, wherein:
   the end cap defines a first aperture and a second aperture; and
   the second set of conductive pins include a first pin and a second pin, the first pin extending through the first aperture, the second pin extending through the second aperture.

8. The lighting fixture of claim 1, wherein the battery unit further comprises an end cap coupled to the battery unit housing to enclose a first end of the battery unit housing.

9. The lighting fixture of claim 8, wherein the battery unit further comprises a pin holder coupled to the end cap, the pin holder configured to support the first set of conductive pins.

10. The lighting fixture of claim 8, wherein:
the end cap defines a first aperture and a second aperture; and
the first set of conductive pins include a first pin and a second pin, the first pin extending into the first aperture, the second pin extending into the second aperture.

11. The lighting fixture of claim 8, wherein the battery unit further comprises an end cap assembly coupled to the battery unit housing to enclose a second end of the battery unit housing.

12. The lighting fixture of claim 11, wherein the end cap assembly comprises:
a first end cap coupled to the battery unit housing; and
a second end cap comprising a threaded portion, the threaded portion of the second end cap configured to engage a threaded portion of the first end cap.

13. The lighting fixture of claim 12, wherein the battery unit further comprises one or more battery spacers positioned between the first end cap and the one or more batteries.

14. The lighting fixture of claim 12, wherein the battery interface comprises a sleeve configured to cover at least a portion of the end cap assembly.

15. The lighting fixture of claim 1, wherein the battery unit is configured to slide into and out of the battery interface housing.

16. A battery interface comprising:
a battery interface housing configured to be mounted to a light fixture and accommodate a battery unit housing, the battery interface housing including
a first set of conductive pins configured to be coupled one or more light sources of the light fixture;
an end cap coupled to the battery interface housing to enclose a first end of the battery interface housing; and,
a pin holder secured to the end cap, the pin holder configured to support the first set of conductive pins,
wherein the first set of conductive pins are configured to contact a second set of conductive pins of the battery unit housing when the battery unit housing is disposed within the battery interface housing.

17. The battery interface of claim 16 further including a sleeve disposed at a second end of the battery interface, the sleeve being configured to form a fluid-tight seal between the sleeve and an sealing member of an end cap of the battery unit housing and the sleeve.

18. The battery interface of claim 16, wherein at least a portion of battery interface is disposed within a fixture housing of the lighting fixture.

19. The battery interface of claim 16, wherein the battery interface housing comprises a mounting bracket.

* * * * *